Jan. 27, 1959  F. LOONEY ET AL  2,870,470
WINDSHIELD CLEANING DEVICE
Filed Aug. 16, 1956

FRED LOONEY
HOWARD O. EARNEST
INVENTORS.

BY *Fulwider, Mattingly*
*and Huntley*
ATTORNEYS.

United States Patent Office 2,870,470
Patented Jan. 27, 1959

2,870,470

WINDSHIELD CLEANING DEVICE

Fred Looney and Howard O. Earnest, Long Beach, Calif.

Application August 16, 1956, Serial No. 604,412

1 Claim. (Cl. 15—118)

The present invention relates generally to the field of window cleaning and more particularly to a device for cleaning the windshields of automotive vehicles.

It is well known that a moving automotive vehicle rapidly accumulates insects and other foreign materials on its windshield. The extent of such accumulation is generally proportional to the speed of the vehicle and the density of the insects in the air. Such accumulation is difficult to remove. This is especially true with regard to dried insects. The removal of such accumulation presently requires considerable time and effort on the part of service station attendants and accordingly reduces the time available for other duties. Thus, the windshield cleaning operation accounts for a considerable percentage of the labor cost of servicing an automotive vehicle.

It is a major object of the present invention to provide a novel and improved windshield cleaning device.

Another object is to provide a windshield cleaning device which reduces to a minimum the expenditure of time and labor required to clean the windshield of an automotive vehicle.

A further object of the invention is to provide a windshield cleaning device which is inexpensive to manufacture.

It is another object to provide a windshield cleaning device which is extremely efficient in its cleaning operation and capable of thoroughly removing all insects and other foreign matter from the windshield.

Yet another object is to provide a windshield cleaning device which uses water as a cleaning agent and does not require any special glass-cleansing chemicals.

A further object of the invention is to provide a windshield cleaning device which offers a comparatively long service life before requiring replacement.

Figure 1:
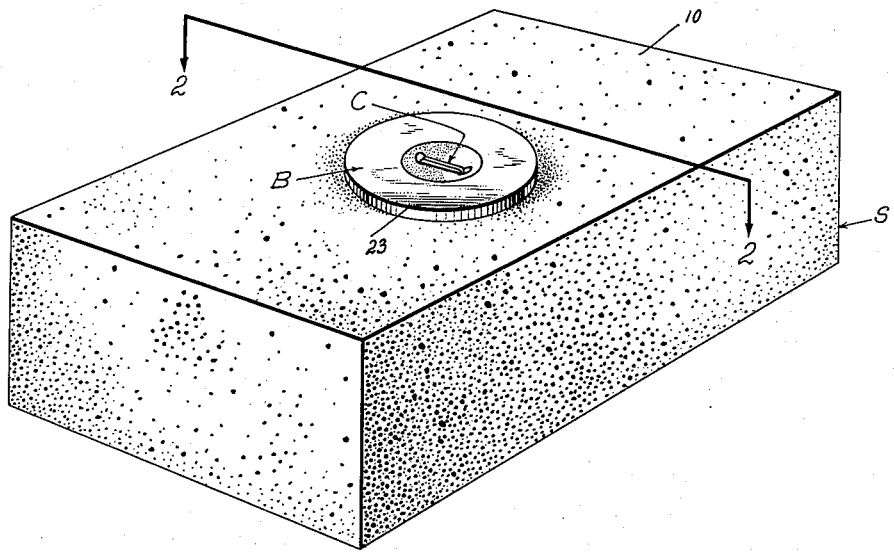
Figure 2:
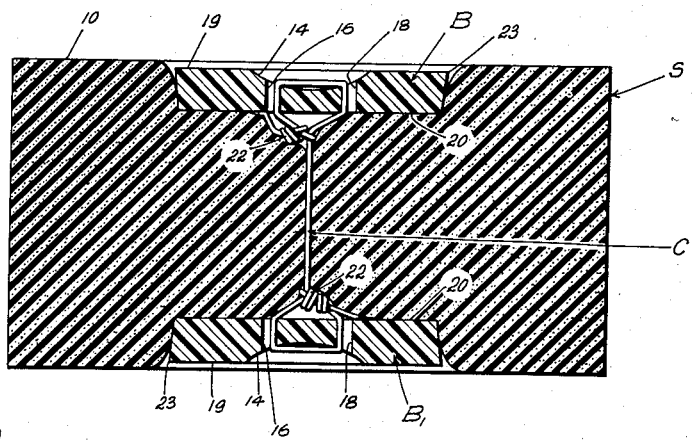

These and other objects and advantages of the invention will become apparent from the following detailed description, when taken in conjunction with the appended drawings, wherein:

Figure 1 is a perspective view of a preferred form of windshield cleaning device embodying the present invention; and Figure 2 is a vertical sectional view taken on line 2—2 of Figure 1.

Referring to the drawings, the preferred form of windshield cleaning device embodying the present invention includes a generally rectangular body S formed of a spongy material and a pair of cutter buttons B and $B_1$ secured to the body S by fastening means such as a cord C. The body S will preferably be formed of a material, such as sponge rubber, comprising an elastic porous mass of interlacing fibers. This mass of fibers absorbs water freely, yet when wetted the fibers do not loose their toughness. This material is also form-retaining in either a wet or dry condition. The cutter buttons B should be formed of a hard substance, such as one of the synthetic plastics. This substance should not, however, be hard enough to cut or scratch glass.

More particularly as noted hereinabove, the body S is generally rectangular in configuration. Its flat upper and lower surfaces 10 and 12 constitute wiping surfaces engageable with a windshield to be cleaned. The cutter buttons B and $B_1$ are of identical construction and are positioned at the center of the respective wiping surfaces 10 and 12. Each cutter button is generally disk-like in shape and its front side 19 is coaxially formed with a generally hemispherical depression 14. A pair of apertures 16 and 18 extend from the inner portion of the depression 14 to the rear side 20 of the cutter button. The opposite ends of the cord C extend through the passages 16 and 18 and are secured with knots 22. The length of the cord C should be such that the front sides 19 of the cutter buttons B and $B_1$ are recessed a short distance relative to the wiping surfaces 10 and 12 of the body S, as indicated in Figure 2. The cord C will constantly be under tension since the material of the body S displaced by the cutter buttons will exert an outward pressure on the latter. The front periphery of each cutter button constitutes a cutting edge 23.

In the use of the aforedescribed windshield cleaning device, the body S is first saturated with clean water as by dipping it in a bucket or the like. Next, the operator grasps the body S and applies one of the wiping surfaces 10 or 12 to the windshield to be cleaned. Thereafter, he merely rubs the wiping surface over the surface of the windshield while applying pressure towards the windshield surface. The application of such pressure will cause the wiping surface engaged with the windshield to be retracted until the front side 19 of its cutter button engages the windshield glass. The cutting edge 23 of this cutter button will then contact the insects or other foreign material on the windshield and slice them from the surface thereof. The sponge rubber body S will assist in this operation.

It should be noted that the utilization of cutter buttons B and $B_1$ of a disk-like configuration enables the operator to readily squeeze soiled water from the body S. Additionally, the use of disk-like cutter buttons provides a maximum length of cutting edge for a given size of body S. It has been found that the aforedescribed cleaning device will remove even the most stubbornly clinging insect particles. Moreover, such removal may be effected in a minimum amount of time. It should also be observed that it is not necessary to employ the comparatively expensive glass-cleansing chemicals now utilized extensively in cleaning windshields, but instead common tap water may be used as a cleaning agent with excellent results.

While there has been shown and described hereinabove what is presently considered to be the preferred form of the present invention, it will be apparent that various modifications and changes may be made thereto without departing from the spirit of the invention or the scope of the following claim.

We claim:

A windshield cleaning device, comprising: a generally rectangular sponge block of cellular, resilient material, the upper and lower surfaces of said block being engageable with a windshield to be cleaned; first and second cutter disks substantially centrally disposed relative to the upper and lower surfaces of said block, respectively; aperture means formed in said cutter disks; and cord means extending directly vertically through said block and contained completely within the confines thereof and having its opposite ends affixed to said aperture means so as to secure said cutter disks within the upper and lower portions of said block and normally retracted from the plane of said upper and lower surfaces.

References Cited in the file of this patent

UNITED STATES PATENTS

| | | | |
|---|---|---|---|
| 752,147 | Derick | Feb. 16, | 1904 |
| 765,314 | Hayden | July 19, | 1904 |
| 2,132,820 | Dunaway | Oct. 11, | 1938 |
| 2,156,940 | Graham | May 2, | 1939 |
| 2,596,565 | Kautenberg | May 13, | 1952 |
| 2,644,974 | Anderson | July 4, | 1953 |
| 2,682,678 | Kingman | July 6, | 1954 |
| 2,715,745 | Jacobsen | Aug. 23, | 1955 |